United States Patent
Lubarsky, Jr. et al.

(10) Patent No.: US 6,933,931 B2
(45) Date of Patent: Aug. 23, 2005

(54) METHOD AND APPARATUS OF POSITION LOCATION

(75) Inventors: Andre Lubarsky, Jr., Auburn, CA (US); Don Whitaker, Auburn, CA (US); Paul Alexander, Grass Valley, CA (US)

(73) Assignee: Ceronix, Inc., Auburn, CA (US)

( * ) Notice: Subject to any disclaimer, the term of this patent is extended or adjusted under 35 U.S.C. 154(b) by 0 days.

(21) Appl. No.: 10/646,614

(22) Filed: Aug. 21, 2003

(65) Prior Publication Data

US 2004/0113895 A1 Jun. 17, 2004

Related U.S. Application Data

(60) Provisional application No. 60/452,365, filed on Mar. 4, 2003, provisional application No. 60/452,364, filed on Mar. 4, 2003, provisional application No. 60/432,103, filed on Dec. 9, 2002, provisional application No. 60/432,102, filed on Dec. 9, 2002, provisional application No. 60/411,429, filed on Sep. 16, 2002, provisional application No. 60/405,419, filed on Aug. 23, 2002, provisional application No. 60/405,412, filed on Aug. 23, 2002, provisional application No. 60/405,411, filed on Aug. 23, 2002, provisional application No. 60/405,410, filed on Aug. 23, 2002, provisional application No. 60/405,408, filed on Aug. 23, 2002, and provisional application No. 60/405,407, filed on Aug. 23, 2002.

(51) Int. Cl.[7] .................... G09G 5/00; G08C 21/00
(52) U.S. Cl. ............... 345/174; 178/18.01; 178/18.03; 178/18.05; 178/18.06; 178/19.01; 178/19.03
(58) Field of Search .................. 345/173–184; 178/18.01–18.07, 19.01, 19.06

(56) References Cited

U.S. PATENT DOCUMENTS

| | | | | |
|---|---|---|---|---|
| 2,643,083 A | | 6/1953 | Troutman | 248/129 |
| 2,664,258 A | | 12/1953 | Lanier | 248/172 |
| 4,440,457 A | | 4/1984 | Fogelman et al. | 312/7.2 |
| 4,550,310 A | * | 10/1985 | Yamaguchi et al. | 307/99 |
| 4,914,624 A | * | 4/1990 | Dunthorn | 346/173 |
| 5,008,497 A | * | 4/1991 | Asher | 178/18.05 |
| 5,159,159 A | * | 10/1992 | Asher | 178/18.05 |
| 5,729,250 A | | 3/1998 | Bishop et al. | 345/175 |
| 5,923,319 A | | 7/1999 | Bishop et al. | 345/175 |
| 5,927,668 A | | 7/1999 | Cyrell | 248/317 |
| 6,002,582 A | | 12/1999 | Yeager et al. | 361/681 |
| 6,012,694 A | | 1/2000 | Sullivan, III | 248/323 |
| 6,102,350 A | | 8/2000 | Cyrell | 248/317 |
| 6,164,645 A | | 12/2000 | Weiss | 273/138.2 |
| 6,201,532 B1 | | 3/2001 | Tode et al. | 345/156 |
| 6,318,692 B1 | | 11/2001 | Cyrell | 248/317 |
| 6,334,612 B1 | | 1/2002 | Wurz et al. | 273/143 R |
| 6,368,216 B1 | | 4/2002 | Hedrick et al. | 463/20 |

* cited by examiner

*Primary Examiner*—Vijay Shankar
(74) *Attorney, Agent, or Firm*—Sierra Patent Group, Ltd.

(57) ABSTRACT

An apparatus for sensing the location of user input is disclosed. The apparatus may include a display unit including a screen having a resistive coating disposed on its surface. The apparatus may utilize a sensing signal emanating from the screen through the resistive coating. A sensor array may be disposed about the screen, and sensing electronics are provided to determine the location of user input on the screen by sensing localized deviations in the amplitude of the sensing signal.

15 Claims, 14 Drawing Sheets

METHOD AND APPARATUS OF POSITION LOCATION

CROSS REFERENCE TO RELATED APPLICATIONS

This application is submitted in the name of inventors Andre Lubarsky, Jr., Don Whittaker, and Paul Alexander, assignors to Ceronix, Inc.

This application claims the benefit of U.S. Provisional Application Ser. No. 60/405,412, filed Aug. 23, 2002, U.S. Provisional Application Ser. No. 60/405,409, filed Aug. 23, 2002, U.S. Provisional Application Ser. No. 60/405,408, filed Aug. 23, 2002, U.S. Provisional Application Ser. No. 60/405,411, filed Aug. 23, 2002, U.S. Provisional Application Ser. No. 60/405,410, filed Aug. 23, 2002, U.S. Provisional Application Ser. No. 60/405,407, filed Aug. 23, 2002, U.S. Provisional Application Ser. No. 60/405,419, filed Aug. 23, 2002, U.S. Provisional Application Ser. No. 60/411,429, filed Sep. 16, 2002, U.S. Provisional Application Ser. No. 60/432,103, filed Dec. 9, 2002, U.S. Provisional Application Ser. No. 60/432,102, filed Dec. 9, 2002, U.S. Provisional Application Ser. No. 60/452,365, filed Mar. 4, 2003, and U.S. Provisional Application Ser. No. 60/452,364, filed Mar. 4, 2003.

BACKGROUND

1. Field of the Disclosure

The disclosure relates generally to sensing user input provided by touch on a display screen.

2. The Prior Art

Background

Capacitive touch screens are know in the art. Various methods have been developed for sensing the position touched on a display screen. Such methods include specifically generating a signal that are altered by the capacitance of the user's finger to determine the position on a screen. Other methods include the use of surface acoustic wave (SAW) devices, resistive devices, and the like.

One drawback of prior art devices is that generally such devices are self-contained units embodied in glass sensor panels that are separately attached over the display. Such units tend to be complicated and expensive as they contain the circuitry necessary for generating and sensing the separate signals used to perform the position location. Additionally, the devices of the prior art may impart undesired optical effects on the video display output which much pass through the glass sensor panel. Finally, the devices of the prior art must be carefully aligned to calibrate the position location performed by the device with the video output provided by the display. Thus different sized displays require a correspondingly sized sensor panel.

BRIEF DESCRIPTION OF THE DRAWING FIGURES

DETAILED DESCRIPTION

Figure 1:
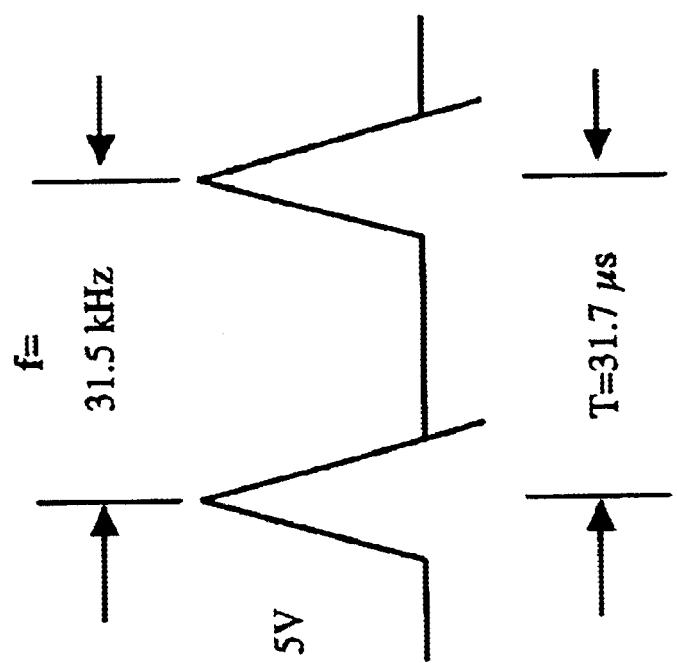
FIG. 1 is a diagram of a pre-existing signal generated by a display device.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to computer equipment. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

The present disclosure utilizes the pre-existing signals used by the host display to synchronize the display, such as the vertical and horizontal synch signals. In typical systems, the frequency between "pips", shown in FIG. 1, may be 31.5 kHz, resulting in a period T of approximately 31 $\mu$s. Typically, the pips may be approximately 3V in amplitude. While the electrical characteristics of the pips may vary from display to display, the electromagnetic noise generated by the pips is generally undesirable. In particular, the noise generated by the pips may interfere with the operation of prior art touch sensors. In this disclosure, however, theses signals are utilized as the source for the sensor system disclosed herein.

Figure 2:
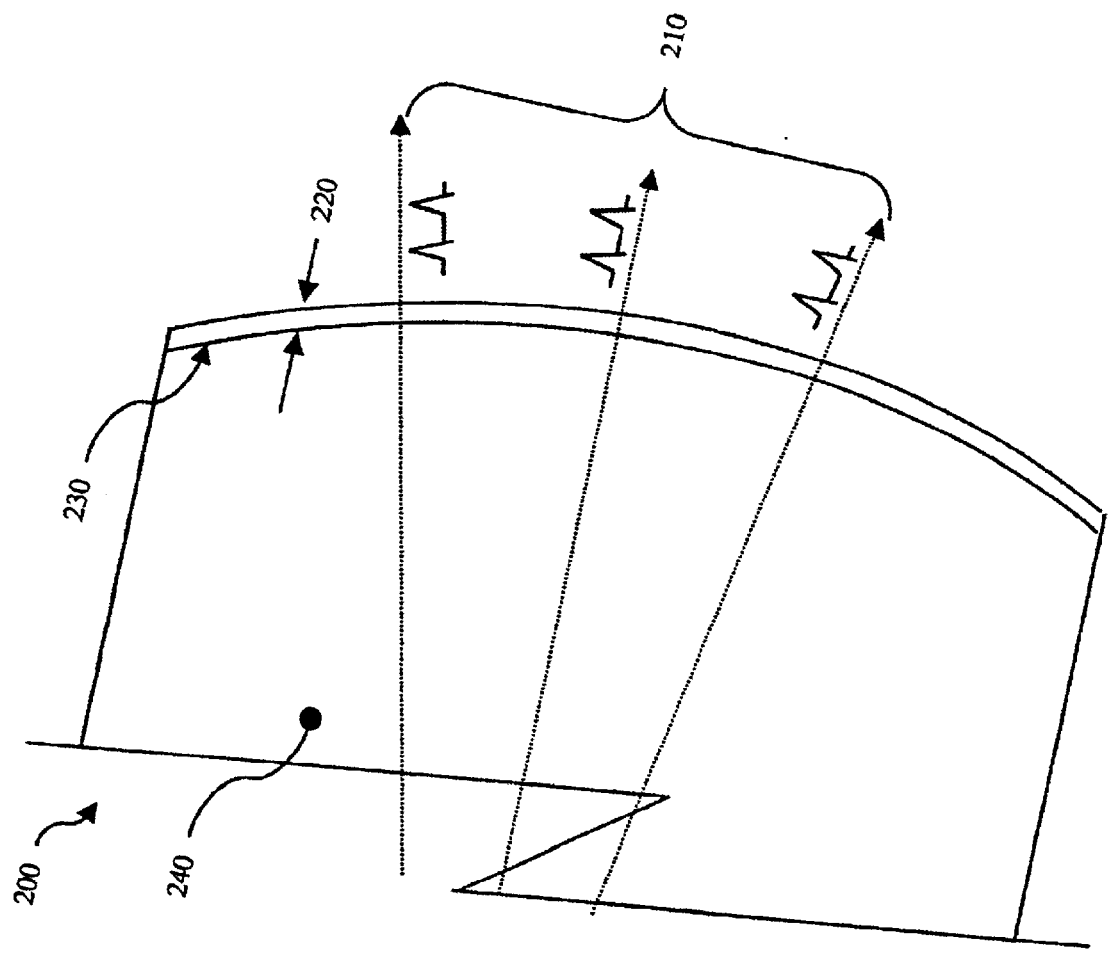
FIG. 2 is a side view of typical CRT display device.

FIG. 2 shows an interior view of typical display device 200 suitable for use in the present disclosure, such as a Cathode Ray Tube (CRT), for displaying images to a user or viewer. FIG. 2 shows the display end 240 of the CRT 200, which provides a display surface 230 from which a visible display emanates. Examples of display 200 include computer monitors, televisions, and the like.

To minimize the effects of the noise 210, typically a layer of conductive coating layer 220 is applied to the surface 230. The layer 220 may be a conductive layer configured to electrically absorb the noise 210 by providing a conductive path to the noise 210. The present disclosure preferably includes a resistive layer 220 having a sheet resistance of between 20k–40k Ω/sq. As will be appreciated by those of ordinary skill in the art, sheet resistance defines an unit area of resistance that remains constant over a given generally square surface area. The layer is preferably uniform in thickness and resistance across the surface of the display.

Figure 3:
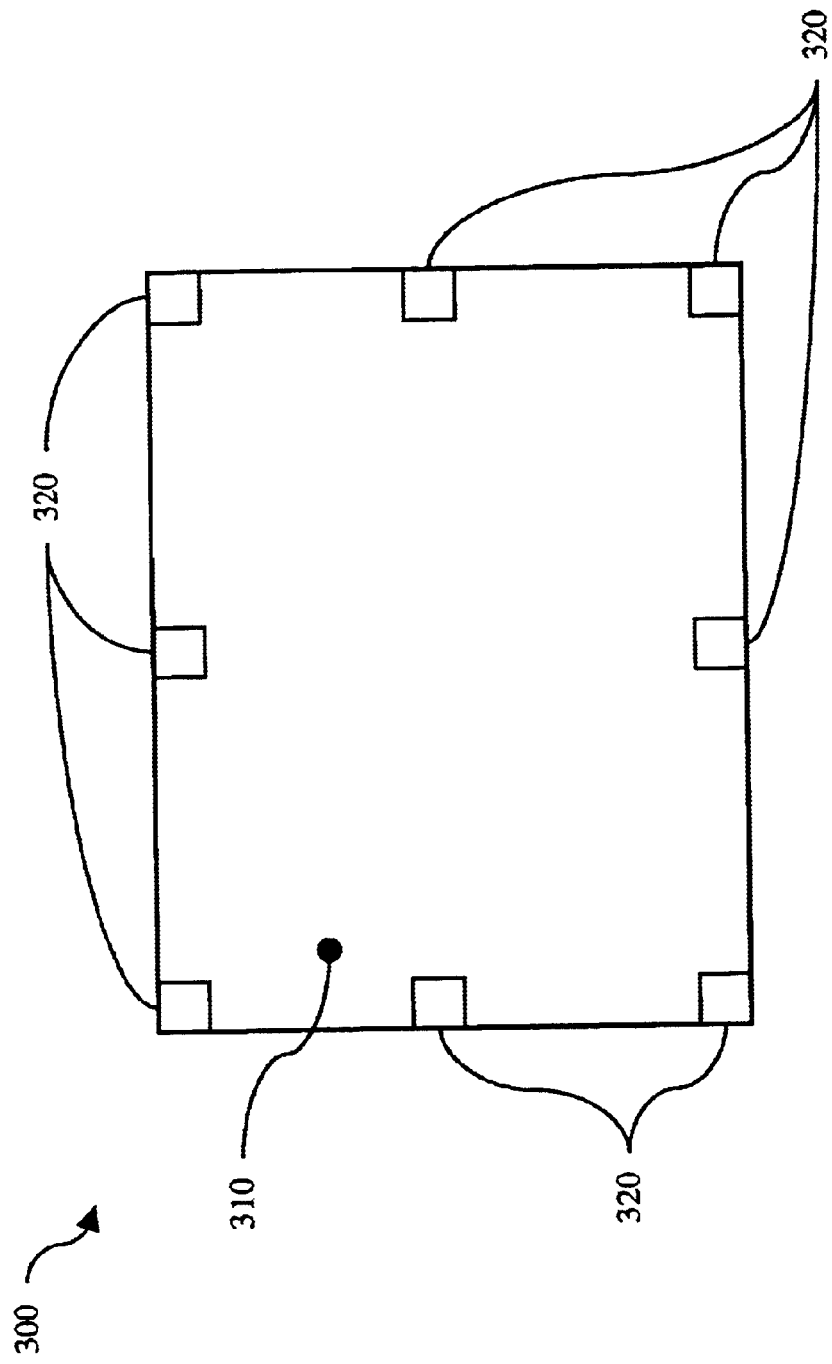
FIG. 3 is a front view of a display having a resistive layer deposited over the surface of the display.

FIG. 3 shows a front view of a display 300 having a resistive layer 310 deposited over the surface of the display. Sensors 320 are disposed about the perimeter of an area to be monitored, thereby defining a sensor boundary encompassing an interior area. The sensors are affixed to the surface of the display such that the sensors are in electrical contact with the resistive layer 310. In one preferred aspect, conductive pads are affixed to the layer 310, and conductive paths, such as wires, may be affixed to the pads. In a preferred embodiment, eight sensors are deployed about the perimeter of a display, though it is contemplated that any number of sensors may be employed depending on the nature and accuracy of the sensing to be performed.

Figure 4:
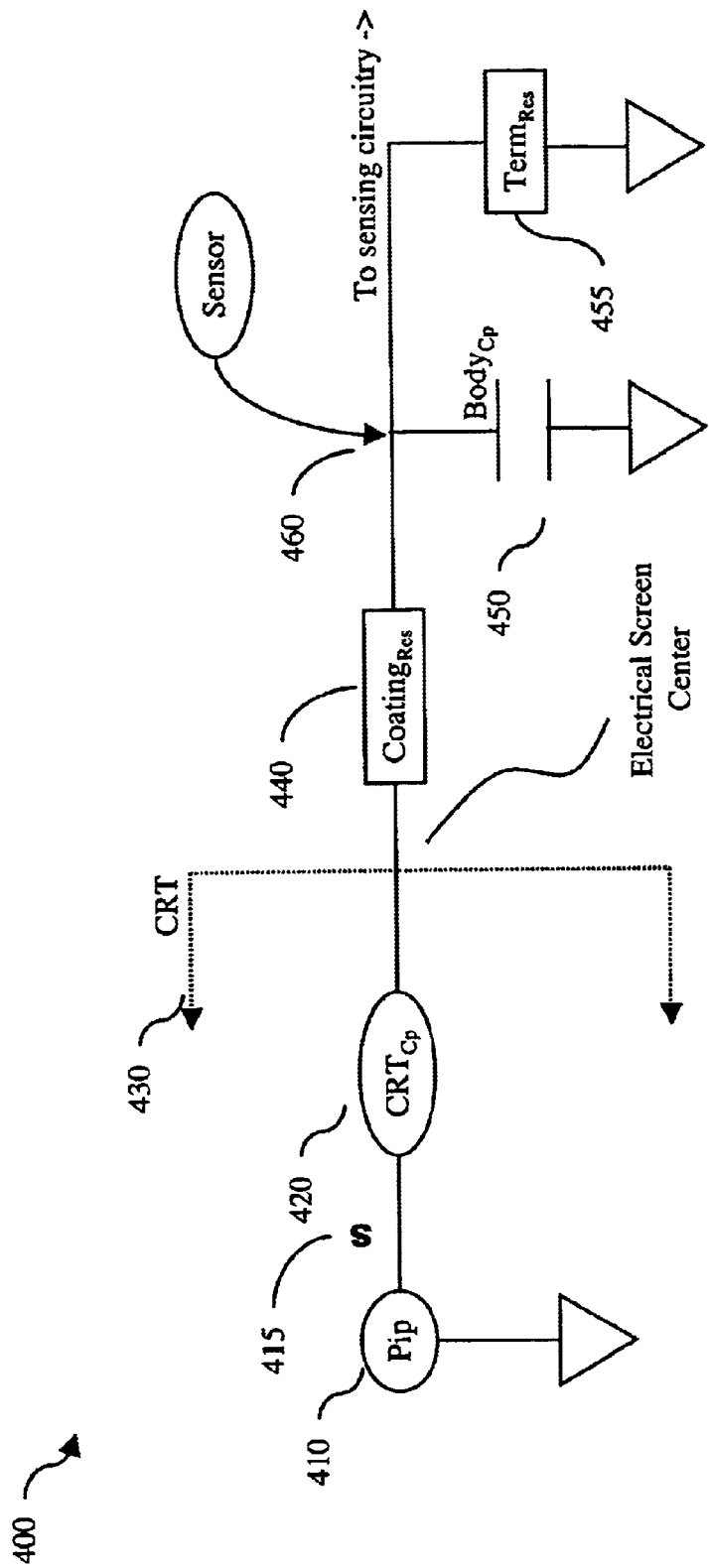
FIG. 4 is an equivalent circuit diagram of a signal path to the sensing system configured in accordance with the teachings of this disclosure.

FIG. 4 is an equivalent circuit diagram of a sensing system 400 configured in accordance with the teachings of this disclosure. The system 400 includes a pip generator 410, such as an internal flyback device, driving a pip signal 415 through a display capacitance $CRT_{Cp}$ 420. Marker 430 defines the electrical boundary of a typical CRT.

The pip signal will then pass through the resistive coating having a coating resistance $Coating_{Res}$ 440. Assuming a user is in electrical proximity to the surface of the display, such as by touching the display screen with a finger, the pip as seen by a sensor will be altered in amplitude by the user's body capacitance Body Cp 450. This alteration generally results in a decrease in amplitude. The signal may then be terminated through a terminating resistor $Term_{Res}$ 455, and provided to the sensing circuitry. In one exemplary embodiment, the user's finger is placed at the sensor, which is an electrical equivalent of node 460.

Figure 5:
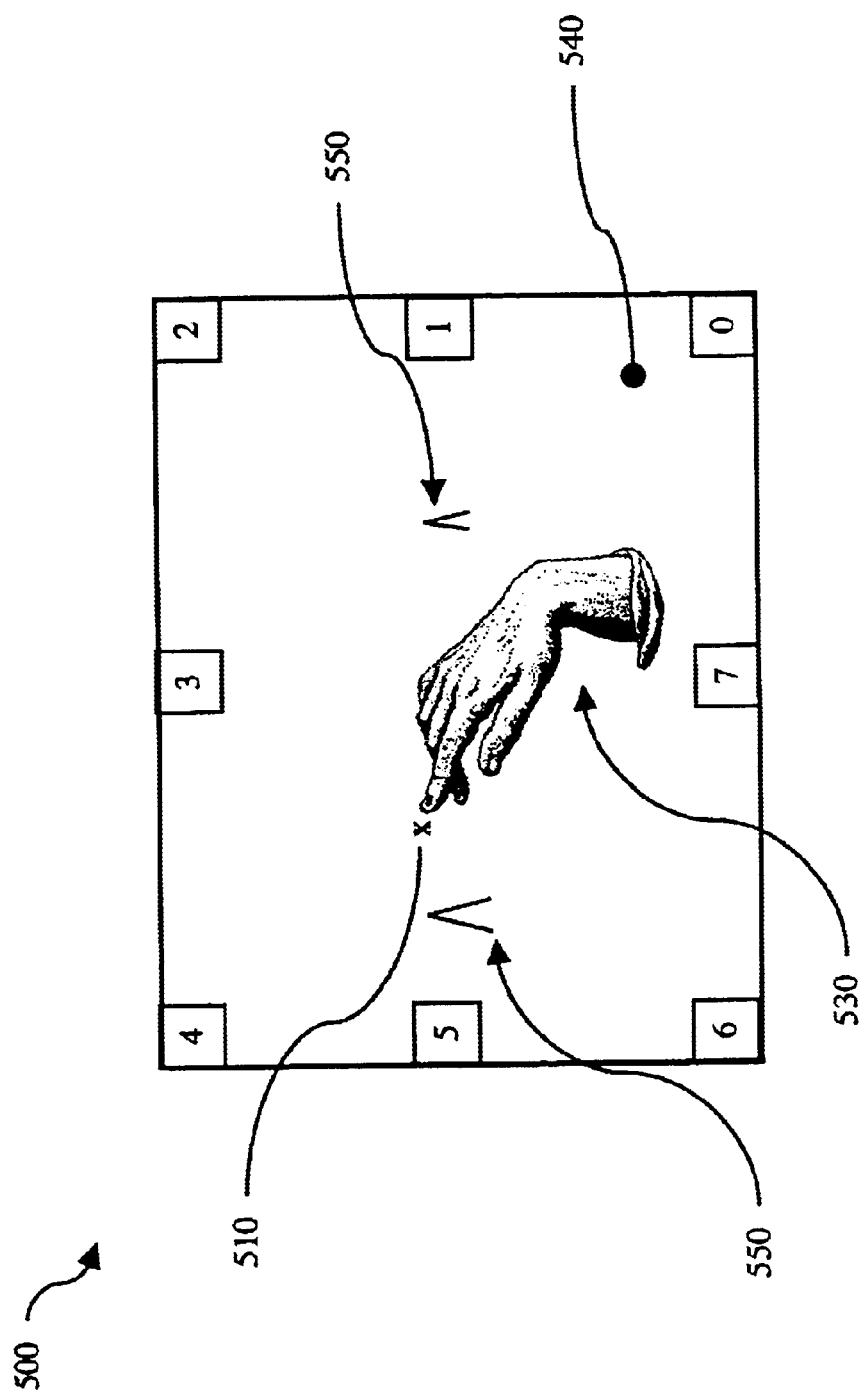
FIG. 5 is an end view of a position location system configured in accordance with the teachings of this disclosure.

FIG. 5 shows a front view of a position location system 500 configured in accordance with the teachings of this disclosure. The system 500 includes a display surface upon which a resistive coating layer 540 has been applied.

The system 500 further includes a sensor array comprised of sensors 0–7 disposed about an area to be sensed. It is contemplated that any number of sensors may be employed depending on the area to be sensed or the desired complexity of the sensing electronics. In an exemplary embodiment, eight sensors 0–7 are arranged about the perimeter of a display screen as shown FIG. 5.

In operation, when a user's finger 530 touches the screen at a location 510, the pip 550 is partially attenuated by the user's body capacitance. From the point of view of a sensor, the farther away from the sensor the user's finger is located, the larger the amplitude of the sensed signal. This is because any sensed signal must pass through a larger sheet resistance emanating from the center of the screen before being sensed, resulting in a larger voltage drop across the resistive coating and attenuated by the user's body capacitance, as will be appreciated from the equivalent circuit illustrated in FIG. 4.

Thus, a reverse relationship may be defined wherein the smaller the sensed pip signal, the closer the sensed location is to a particular sensor. The present disclosure utilizes this relationship to locate user input on a display screen. Thus, the present disclosure provides a system responsive to deviations sensed in the pre-existing signals provided by the host display. By sensing the localized deviations in the pip signal proximate to each sensor in an array, the present disclosure may accurately determine the location of a user input.

Figure 6:
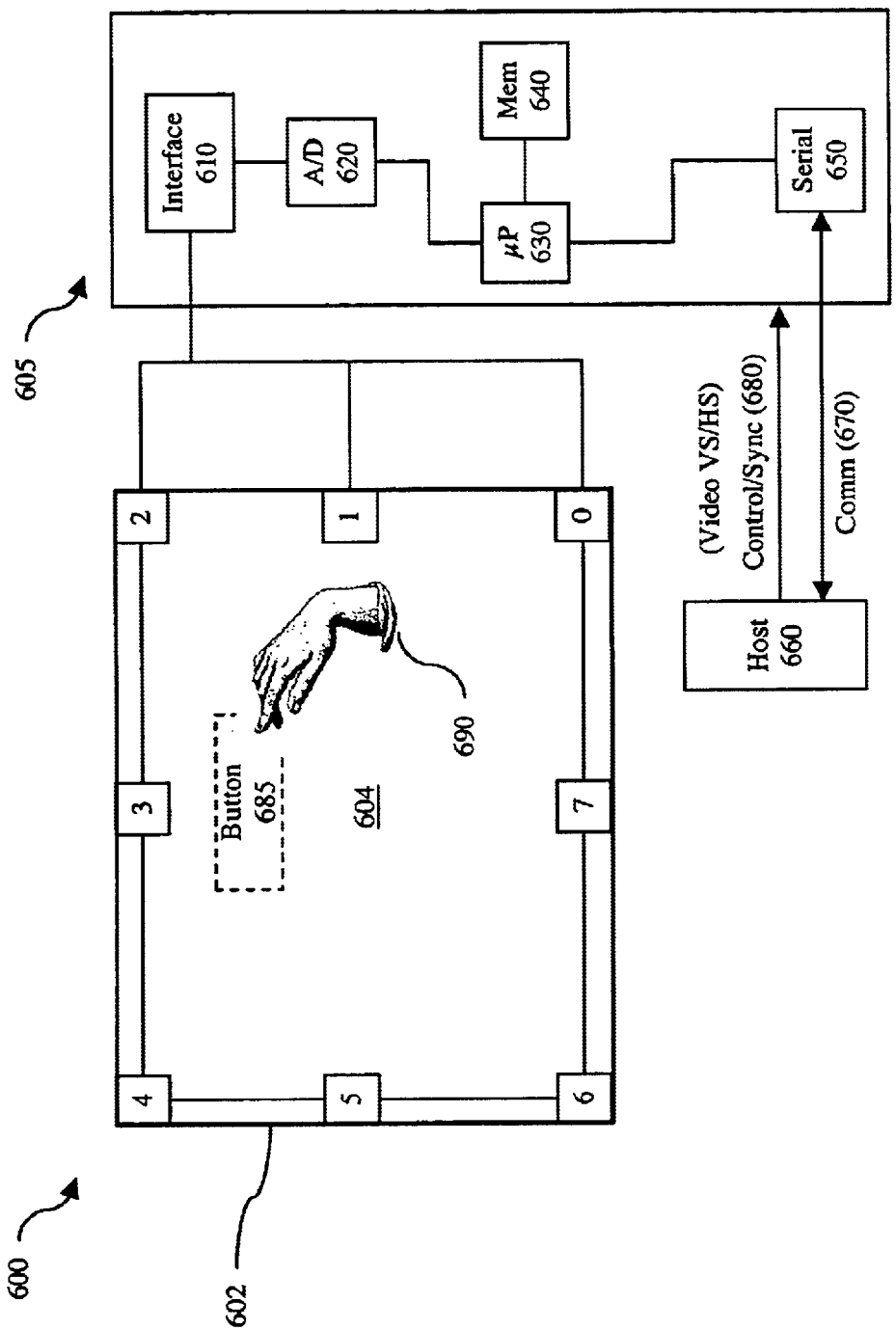
FIG. 6 is a functional diagram of a position sensing system configured in accordance with the teachings of this disclosure.

FIG. 6 is a functional diagram of a position sensing system 600 configured in accordance with the teachings of this disclosure. It is contemplated that embodiments of this disclosure may be deployed in a wide variety of host display units, such as gaming devices, personal computers, kiosks, or wherever it is desired to provide a touch screen user interface.

FIG. 6 shows a front view of a host display unit 602 having a sensor array of sensors 0–7 disposed about a screen 604 configured in accordance with this disclosure. The host unit 602 may also include native host electronics 660 necessary for the operation of the host device.

The sensing system 600 further includes sensing circuitry 605 for determining the position of a sensed signal on the screen 604 in accordance with the teachings of this disclosure. The circuitry 605 may include an analog interface unit 610 for sensing the signals provided by the sensors 0–7. The interface unit 610 is preferably configured to couple the signals provided by the sensors 0–7 to an analog/digital (A/D) converter 620, which in turn provides a digital representation of the sensor array input to a microprocessor 630. The processor 630 may be coupled to the host electronics 660 through a serial interface 650, and may send and receive commands and data through serial protocols as is known in the art, such as RS-232 or USB. The processor 630 and memory 640 may be used to store, retrieve, and execute software embodiments of this disclosure.

It is contemplated that the sensing electronics of this disclosure may comprise hardware as is known in the art. Additionally, the processor may have processing power commensurate with the complexity of the sensor array and/or desired application. Thus, electronics of the sensing circuit 605 may be provided in an 8051-based chipset, processors such as a PENTIUM® from INTEL®, as well as PowerPC® processors from MOTOROLA®.

The sensing circuitry 605 may also receive control and synchronization signals 680 from the host unit electronics 660. For example, signals such as the vertical or horizontal sync may be used to synchronize and control the sensing operations.

In operation, the host display unit 602 may present the user 690 with a display, such as button 685, on the screen 604. When the user 690 touches the screen 604, the sensing electronics 605 determine the position of the user input by sensing the relative amplitudes of the sensed pip signals as sensed by the sensors 0–7.

It is contemplated that the determination of the input location on the screen may be accomplished in variety of manners. For example, the sensed amplitudes may be placed in an array in memory used to solve linear equations to determine the X and Y coordinates of the finger position as is known in the art. Differential sensing techniques may be used for minimizing the effects of external noise produced by the host display and other external sources.

Furthermore, the inputs provided by the sensor array may be normalized to compensate for changes in the user's body capacitance caused by environmental or other factors. Using such techniques, the sensing function may be made independent of the absolute magnitude of the user's body capacitance, and will accept a wide variety of users having corresponding variations in individual body capacitance.

When the location of the input has been determined, the serial interface 650 may provide the location information to the host unit in an appropriate format.

As will be appreciated from this disclosure, the methods and apparatus disclosed herein provide for sensing the location of user input using the pre-existing signals and screen coating used for EMI shielding provided by the host display, eliminating the need for external screens or signals.

Figure 7:
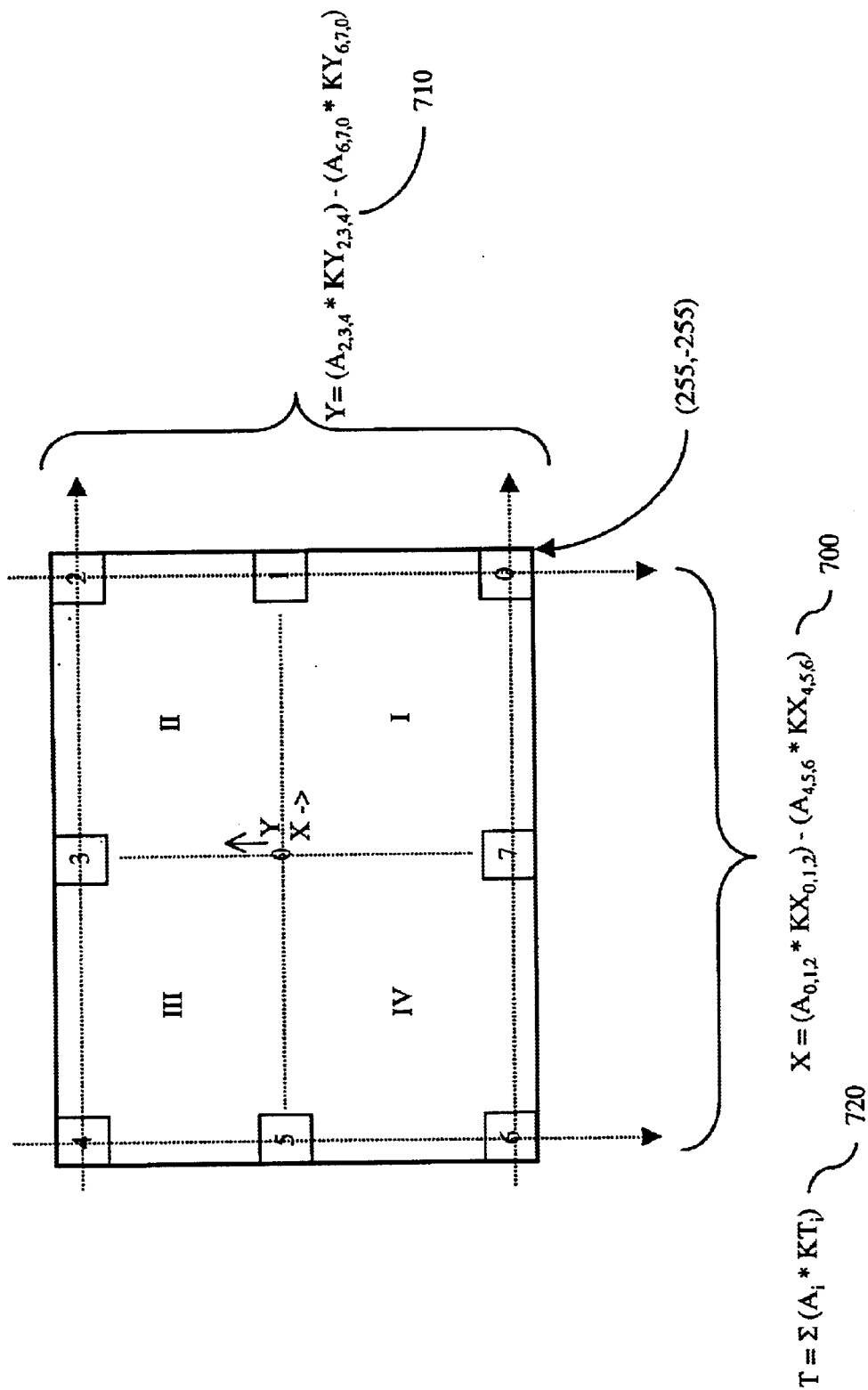
FIG. 7 is a diagram showing how sensing and location calculations are performed in one aspect of a disclosed position sensing system.

FIG. 7 presents an example of how sensing and location calculations are performed in one aspect of a disclosed position sensing system. To provide a cost-effective solution, in one aspect, an 8-bit processor is used. In a preferred embodiment, the screen may be divided into quadrants I-IV as shown in FIG. 7. In a preferred aspect, the origin is placed at the center of the screen, with the x-axis being positive to the right and the y-axis being positive in an upward direction. Since the origin is at the center of the screen and a 10-bit A/D providing 0–1023 steps is utilized, the absolute resolution across the entire screen doubles, thus effectively gaining an extra bit to improve throughput and other functions. The present embodiment utilizes only integer arithmetic (no floating point math) to perform all calculations.

In a preferred embodiment, the system automatically performs five initial calibration computations, which may be performed continuously. The system computes the offset, the gain, the x-coefficient, the y-coefficient, and the T coefficient. The calibration calculations may be performed at start-up and as often as needed thereafter. Each calculation computation will now be disclosed.

The offset is calculated by using the steady-state value of the pip at each sensor as measured by the A/D. The system then nulls out each sensor using the respective steady state value and D/A, resulting in a zero-base offset for each sensor. The results of the offset calculation may be used to calibrate the sensing circuitry to a known zero starting value. These offset values are generated by a D/A and used to populate an array.

The gain function is performed to maximize the headroom or full-scale value of the A/D. As the maximum amplitude of a sensed signal is determined both by the intensity of the host display and the capacitance value of the user, the system is calibrated using a reference impedance device having a value chosen to correspond to an average user. To calibrate the gain function, the reference device is selectively coupled to each sensor in turn through an analog multiplexer switch in the sensor array. The sensed amplitude is then stored for each sensor in an array. As will be appreciated, this value represents the maximum value for the particular sensor, since directly coupling a device to the sensor corresponds to a user touching the screen directly at the sensor location. The device may comprise a capacitive circuit.

To calibrate the maximum x- and y-values, a further iterative process is used. While the reference capacitor is selectively coupled to a selected sensor, its respective location is known. For example, sensor 0 in FIG. 7 is known to be at the coordinates (1023, −1023), representing the full range of the A/D. After giving the reference device adequate time to charge through the resistive coating, coefficients $Kx_i$, $Ky_i$, and $KT_i$ are determined that force the product of the sensed A/D value and the coefficient to represent the full range of the A/D.

This process is repeated for each sensor in the array, and is calculated separately for the x-axis components and y-axis components. Additionally, to provide a uniform touch value T, all sensors in the array are calibrated to provide coefficients $K_T$ that result in a desired touch value when sensed in proximity to a particular sensor. This process may be repeated as many times as is necessary for a desired accuracy to be achieved. This process provides a high level of accuracy without the need to solve an 8×8 matrix, which can stretch the resources of an 8-bit processor.

The calibration function may be performed in an iterative fashion, with the offset, gain, and coefficient values being determined for each sensor in turn. Performing these calibrations results in utilizing the maximum dynamic range of the A/D and processor capability.

It is contemplated that separate arrays in memory may be populated with the calibration data. For example, one array each may be provided for the offset data, gain data, and so on, with each array containing separate values for each sensor.

Additional methods of calibration and compensation may be provided. For example, to achieve calibration, differential amplifiers may be placed in the signal path of each sensor, with one leg of the amplifier tied to an additional D/A converter. The D/A converter may be pre-fed with a value to establish a zero baseline output for that particular sensor, then storing the offsets. These values may be calculated during the offset calibration routine. The system may employ active fast peak detection circuits as is known in the art.

Referring still to FIG. 7, the x-axis location is computed using equation 700, which in essence calculates the differences between the right side sensors (0, 1, and 2) and the left side sensors (4, 5, and 6), in combination with their respect x-coefficients. Likewise, the y-axis position is calculated using equation 710, and calculates the difference between the top sensors (2, 3, and 4) and the bottom sensors (6, 7, and 0), in combination with their respective y-coefficients. Equation 720 provides the touch value T, and uses the system of all eight sensors (0–7). Thus, the present system may define a pre-selected set of sensors as upper, lower, left, and right side sensors, and determine the location of user input using these sets of sensors in combination with the calculated calibration coefficients.

In a preferred embodiment, these calculations are performed at a rate appropriate for the synch signals of the host device. In one aspect, the calculations are performed at a rate of 60/sec, corresponding to a typical vertical synch rate of approximately 60–70 Hz. Each A/D reading is sampled between the horizontal synch signals which are interspersed between the vertical synch. Additionally, the system may be synchronized to sample when a pip is present, or when a horizontal synch signal is present.

Furthermore, the system may be configured to periodically sample the beam current intensity signal, and detect whether the beam current has changed, necessitating a re-calibration because any change in the beam current intensity will necessarily affect the intensity of the pips, possibly leading to a location detection errors. Such a recalibration result in the calculation of new calibration coefficients, thus compensating for the intensity change.

A reference voltage signal may also be provided to assist in the calibration of the A/D, and this signal may be sampled periodically as well. In a preferred embodiment, all sampling, calculations, and communications are performed between vertical synch signals.

It will be appreciated that the location determination calculation may be performed separately from the calibration calculation, which may be performed on an as-needed basis.

Furthermore, it has been found that when a user touches the area of the screen near an edge, but between sensors, some error occurs. It has been further found that the error has a pattern that resembles a parabola in shape. To compensate for this, a between-sensor error correction routine may be applied wherein a correction routine may be applied according to a parabolic quadratic equation when the user touches the screen in a predetermined area.

As will be appreciated from this disclosure, the methods and apparatus disclosed herein provide for sensing the location of user input using the pre-existing signals and screen provided by the host display, eliminating the need for external screens or signals.

One challenge faced by this disclosure involves rapidly changing screens that vary in brightness. This may occur, for example, when a user scrolls through a series of rapidly appearing screens. In such cases, challenges to calibration may occur. For example, the beam current may change in response to the screen brightness, and the pip signal may vary widely in amplitude. If the screen is touched while the system is calibrating in response to the quick screen change, a potentially false or inaccurate calibration may occur.

An alternative method of sensing and calibration is now disclosed.

This embodiment supplies an additional pip signal that is constant in amplitude, regardless of the display on the screen. The position location electronics may then be configured to ignore the original pip (the horizontal sync signal), and use the newly generated pip, known herein as a sensing signal.

Various circuits may be employed for creating the sensing signal. In one embodiment, a blocking oscillator circuit including a one-shot oscillator was used; in a preferred embodiment, a dual one-shot contained on an integrated circuit is used where the dual nature of the circuit may be used to advantageously manage delays of the pulses, thereby creating desired characteristics of the sensing signal.

The sensing signal generating circuitry of this disclosure may be deployed directly on a display video circuit board, or attached as a separate daughter board.

The sensing signal generating circuitry is configured to receive a preexisting signal generated by the display electronics and used to generate the horizontal sync signals. In one embodiment, the preexisting signal comprises a pulse approximately 30 Vpp and has a period sufficient to generate horizontal sync signals. One embodiment of a host display device utilized generates the horizontal sync signals by triggering on the falling edge of the preexisting signal.

In a further embodiment, the sensing signal generation circuitry is configured to receive the preexisting signal and trigger on the rising edge of the preexisting signal. By so triggering, the sensing signal is generated 180° out of phase from the horizontal sync signal. In a further embodiment, the sensing signal is generated at a constant amplitude, independent of the screen display intensity.

To provide the sensing signal to the display, the sensing signal may be injected at any point in the display circuitry that will result in having the sensing signal emanate from the conductively coated screen. In one embodiment, the sensing signal is injected into the flyback transformer.

In a further embodiment, by selecting opposite sensor pairs and applying the two X and Y algorithms, differential noise may be minimized and eliminated.

Figure 9:
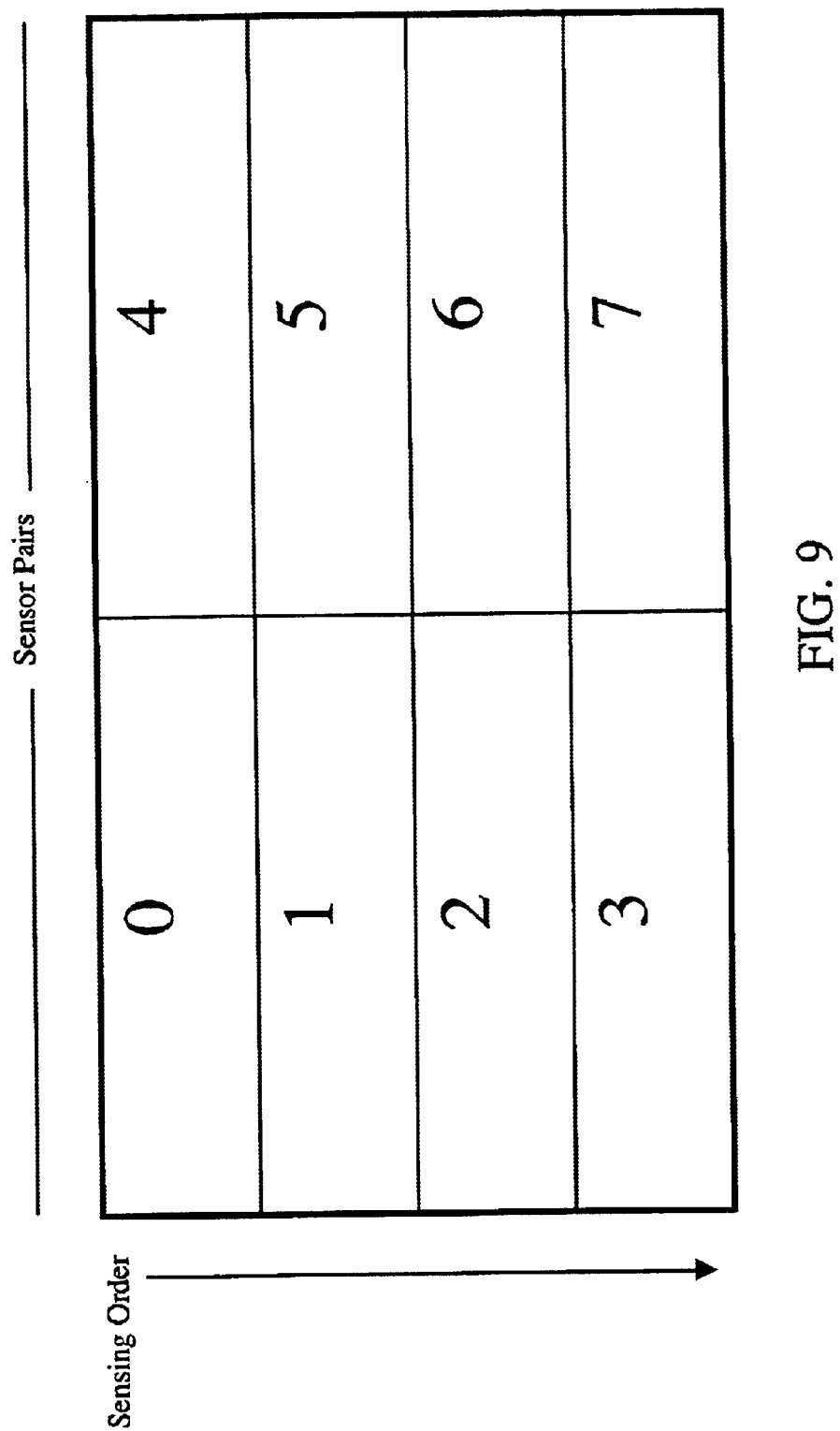
FIG. 9 is a table showing one embodiment of sensor pairing and sensing order.

Referring briefly to FIG. 9, a table is presented showing one embodiment of the order and pairing of sensors. FIG. 9 shows that the sensors are paired as sensors 0,4; 1,5; 2,6; and 3,7; and are sensed in that order. Of course, other arrangements may be used.

Figure 11:
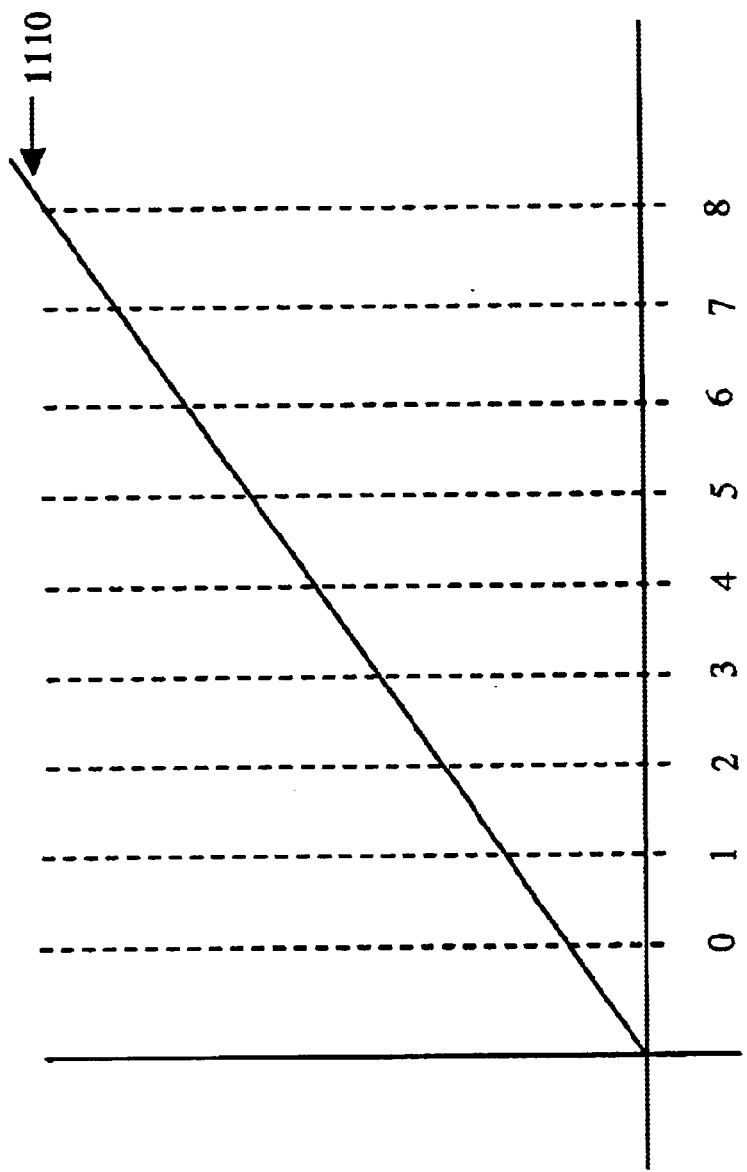
FIGS. 11 and 12 are sensing noise diagrams.
Figure 12:
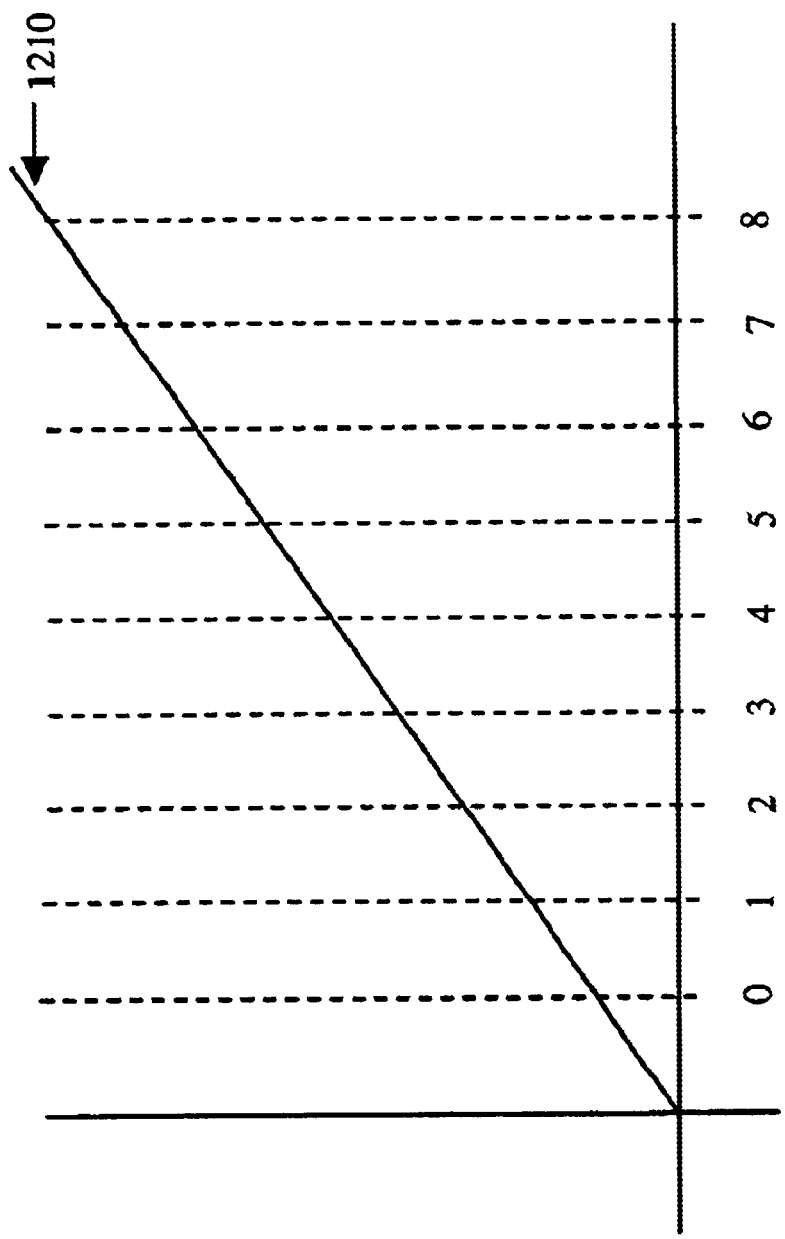

The improvement in noise reduction is shown in FIG. 11 and FIG. 12. FIG. 11 shows the noise differential created when the input is sampled sequentially. FIG. 12 shows the noise differential created when the input is sampled using opposite pairs as disclosed herein. Noise curve 1110 shows the variation of the noise during the cycle. The time differential between the sampling is 30 microseconds. Therefore, the time difference between sampling at time 0 and the sampling at time 4 in FIG. 11, which makes up the opposite pairs, is 120 microseconds. In contrast, by sampling at point 0 and then at point 4 the time differential is only 30 microseconds.

Figure 8:
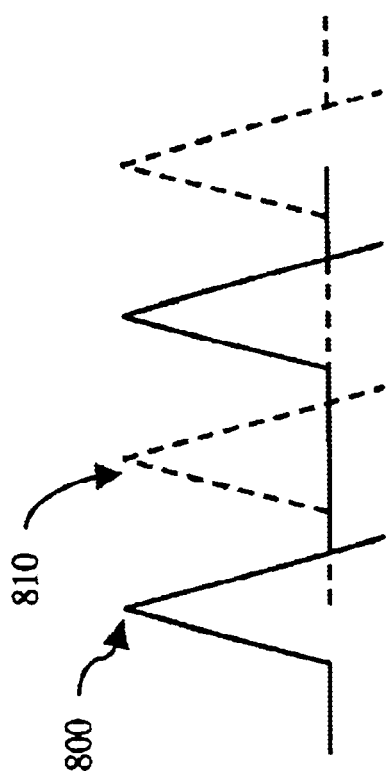
FIG. 8 is a timing diagram showing one arrangement of sensor signals interspersed with the pre-existing horizontal synch signal.

FIG. 8 shows the relationship between a sensing signal 800 and the horizontal synch signal 810. As described above, position location embodiments of this disclosure are configured to trigger on the vertical sync. In a further embodiment, the sensing signal 800 is generated such that it is the first signal sensed after the vertical sync signal. Because the sensing signal is being generated 180° out of phase with respect to the horizontal sync signal, the sensing signal will be interspersed in between the preexisting horizontal sync signals, as shown in FIG. 8 as having the sensing signal 800 (in solid lines) interspersed between the horizontal synch signal 810 (shown in dashed lines).

To ensure that only sensing signals are being used for position location, in one embodiment the position location circuitry is configured to read alternate signals, beginning with the sensing signal. In other words, the present system utilizes every other pip signal, thereby effectively ignoring the preexisting horizontal sync pip signal. Such an alternating system may be implemented in software utilizing the interrupt-driven nature of the processor. To provide further accuracy, the input to the sensing circuitry may be disconnected when the preexisting pip signal is present.

By so ignoring the preexisting pip signal and using only the sensing signal for position location, this embodiment utilizes a pip sensing signal of constant amplitude, thereby greatly increasing the accuracy and reliability of the system, regardless of the display's video intensity.

Additional benefits may be provided due to the ability to generate the sensing signal. For example, the period of the sensing signal may be adjusted to provide optimum position location for particular displays, environmental conditions, or other factors. Furthermore, as the body capacitance and the screen's resistive coatings form an electrical filter, additional tracking accuracy may be provided by controlling characteristics of the sensing signal, such as the rise and fall times. The leading and falling edges of the signal may be generated to provide predetermined frequency components in a particular part of the frequency spectrum. For example, more or less high frequency components may be provided to smooth the system's response. Thus, the shape of the sensing signal may be adjusted to accomplish a desired response.

To provide even further reliability, the system may also provide for periodic automatic calibration. Such calibration may be independent of the beam current, in contrast to the calibration methods disclosed above. In one embodiment, the system is configured to determine on a timer basis whether the screen is being touched. If the screen is not being touched, the system may then perform a calibration routine. The system may also be configured to wait until a predetermined number of "no-touches" have been sensed before a calibration routine is performed. This can be used to ensure that calibration routines are performed when the system is certain that the screen is not being touched.

In an alternative embodiment, the sensor signal pulse may be generated using a microprocessor instead of additional circuitry on a daughter board. Using a microprocessor, the sensor pulse may be generated as desired on a discrete basis, rather that having pulse generating circuitry continuously generating pulses whether needed or not. This results in a significant savings of programming overhead, and provides improved calibration times.

Additionally, under microprocessor control, sensor pulses may be generated to known parameters very accurately, increasing the overall location accuracy of the system. This is because since the properties of the sensor pulse are well know, any degradation sensed by the sensors may be more precisely measured, thus providing a more accurate determination of the location of the user input.

Additionally, since the properties of the pulse may be easily changed, the transition times and the period of the sensor pulse may be selectively adjusted to provide optimum content in the frequency domain using Fourier analysis. Using such techniques, spectral emissions may be tailored according the host monitor's requirements or other considerations, such as environmental conditions.

In one embodiment, an additional I/O port is coupled to the signal generating means, and configured to be controlled by the microprocessor such that sensor pulse parameters such as rise time, fall time, width or period, and amplitude may be controlled. The existing horizontal synch signal may be used as a timing device.

In a further embodiment, the microprocessor is programmed to generate a sensor signal pulse immediately after the first horizontal synch pulse following a vertical synch. Thereafter, following each subsequent horizontal synch signal, an associated sensor signal pulse is generated for a particular sensor. That is, one sensor signal pulse is generated for each sensor employed. Thus in the preferred embodiment disclosed herein, eight sensor signal pulses are generated, with each sensor's measurement being taken and stored in turn. It is contemplated that other sensor signal generating algorithms may be employed.

In a further disclosed embodiment, the microprocessor may be configured to alternate between a sense mode and a calibrate mode. In one embodiment, the microprocessor may periodically determine whether touch input is being provided by a user. If no touch is sensed, the system may perform a calibration routine as described above. If input is sensed, then calibration is delayed while the location of the input is sensed. Input may be sensed by determining whether an A/D reading of T function has exceeded a desired threshold.

In one embodiment, the system checks for input approximately every one-half second. Of course, other intervals may be utilized. By periodically calibrating the system, accuracy may be ensured regardless of the screen intensity or other factors, such as environmental conditions or system interruptions due to maintenance or power fluctuations.

Touch sensors that rely on body capacitance must also be able to adapt to variations in the user's body capacitance. As total body capacitance is a function of factors such as body weight and skin thickness, as well as the effects induced by shoes and jewelry, a touch sensor system must be able to adapt to these variations in applied capacitance.

To insure that the system remains accurate despite wide variations in applied capacitance, a normalizing factor may be applied during the location calculation. In one embodiment, a value Q is chosen with reference to the range of the A/D, and is used to form a ratio with the touch factor T as calculated in FIG. 7 as equation 720. In one aspect, the value of Q is chosen to be 150, roughly corresponding to one-half of the range of the A/D in the disclosed embodiment. The ratio of Q/T is then calculated and multiplied together with the sensed X and Y coordinates.

Thus, the x coordinate may be capacitance-compensated from the following formula:

$$X=Q/T*X$$

Likewise, the y coordinate may be capacitance-compensated from the following formula:

$$Y=Q/T*Y$$

As mentioned above, when the system is performing the calibration routine, the T factor may be normalized to a uniform maximum value. To further achieve capacitance invariance, the normalized maximum value may be chosen to be equal to Q. In this aspect, if T remains constant, then the ratio will normalize to a value of one, thus leaving the sensed X or Y value. Using the benefits of this disclosure, capacitance values ranging from 100 pF to 2000 pF have been sensed successfully.

Figure 10:
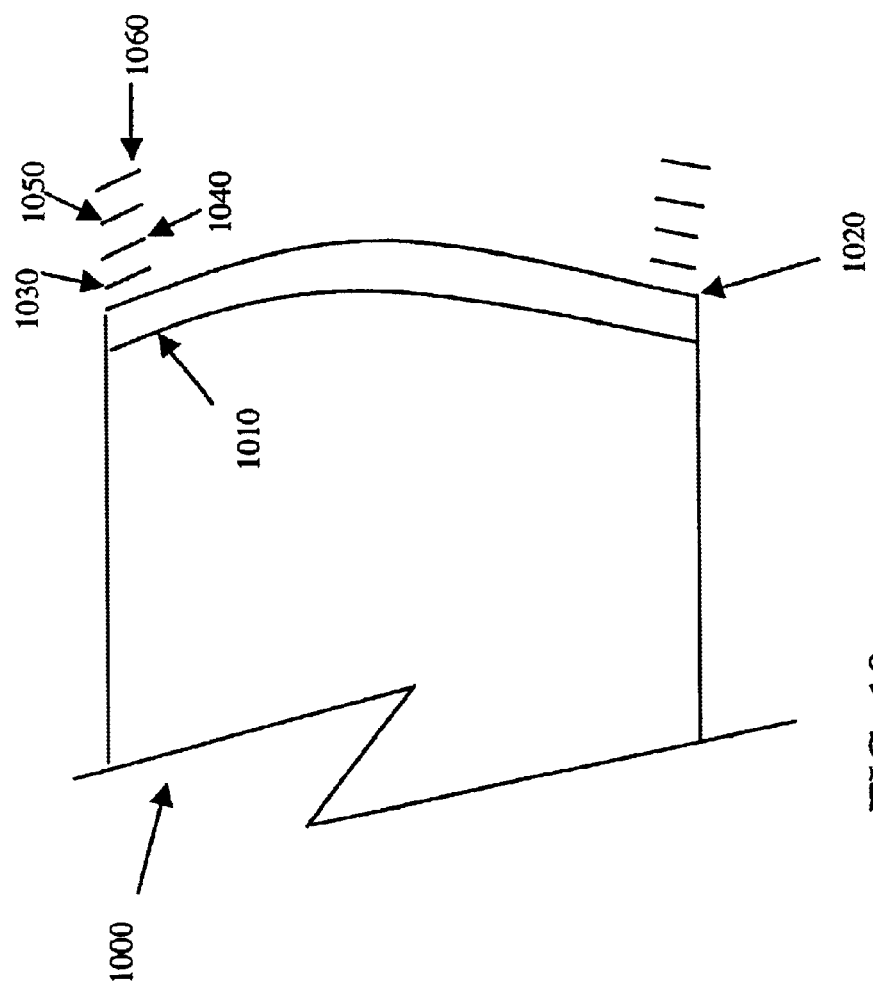
FIG. 10 is a diagram showing one embodiment of a sensor.

Referring now to FIG. 10, a diagram showing different sensor layers of one disclosed embodiment of a position location device 1000 is presented. The first layer is a substrate 1010. The substrate may be a cathode-ray tube or any other surface upon which information is displayed. A cathode ray tube of any size may be used. The next layer of the present embodiment is a resistive coating 1020. The next layer is a colloidal graphite in water lubricant 1030 capable of conducting electrical impulses and adhering to said substrate. The next layer is a copper tape 1040. The next layer is solder 1050. The next layer of the present embodiment is the wire 1060.

The resistive coating 1020 may be created to fit the dimensions of any size cathode ray tube used. The resistive coating 1020 is used to transmit and sense the position of a pointing device such as a finger, conductive pen or other devices as known in the art. The resistive coating 1020 then delivers the information to the wires. The resistive coating 1020 does not require alignment, calibration and recalibration due to the initial factory placement of the coating and wires. The resistive coating 1020 is formed to the dimensions of the substrate and applied directly to the substrate. Then the wires 1040 are place at the coincident boundaries of the substrate and the resistive coating.

This arrangement in the present embodiment improves on the prior art because the prior art required placing the glass cover on the substrate, aligning the glass cover to the substrate, calibrating the glass cover to align with the calibration points on the substrate and recalibration of the points on the substrate any time maintenance was accomplished on the touch screen, the substrate or the software running on the substrate. The resistive coating 1020 simply needs to be applied to the dimensions of the substrate 1010. In contrast, the glass cover of the prior art must be specifically manufactured to reflect the curvature of the substrate, the dimensions of the substrate, and to incorporate the sensing mechanisms that allow it to be used as a touch screen.

The colloidal graphite in water lubricant 1030 is selected for its ability to conduct electrical impulses and adhere to the particular substrate selected. In the present embodiment in which a cathode ray tube is used as a substrate, Aquadag is used to meet the necessary conductivity and adhering requirements. Aquadag is a conductive graphite based paint used in the T.V. industry to create ground planes in cabinets etc. Aquadag is a colloidal dispersion of extremely fine, pure graphite in a water carrier that dries to form an adherent film on virtually all surfaces—including glass and flexible materials. While Aquadag is used in the present embodiment, any adhesive may be used which meet the requirements of conducting the electrical impulses from the resistive coating 1020 and the electrical impulses from substrate and adhering the wires 1040 to the substrate selected for the particular application.

The copper tape 1040 with a conductive adhesive is selected for its ability to maintain conductivity between the resistive coating 1020 and the wire 1060 to be applied. The solder 1050 is selected to further maintain the conductivity between the resistive coating 1020 and the wire 1060.

The wires 1060 are used to sense the differential readings of the resistive coating created by the application to the resistive coating of a pointing device. The wire 1060 are placed in proximity of the resistive coating 1020 so that they sense the application of the pointing device and the signals generated by the resistive coating 1020 are used in the processing of the location of the pointing device. The wires 1060 are selected for their sensitivity to the readings received from the resistive coating 1020. The wires 1060 are placed on the layer of colloidal graphite in water lubricant 1030 so that they will adhere to the substrate. In the present embodiment the wires 1060 also receive the CRT signals. The CRT signals are used in processing the location of the pointing device used.

Figure 13:
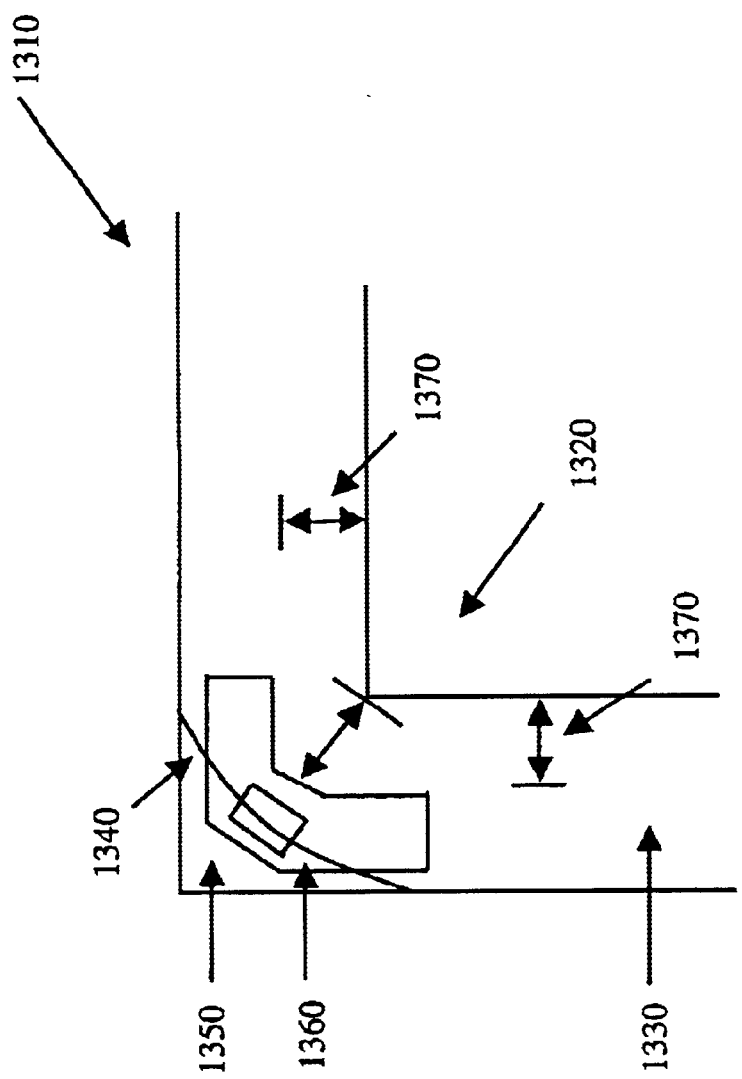
FIG. 13 is a diagram of the placement of a sensor contact.

FIG. 13 shows placement of a sensor contact in one of the corner arrangements of the contacts. The corners represent a peculiar problem of manufacturing the resistive layer. The resistive layer is manufactured by dropping a solution on a spinning element and allowing the solution to dry and form a uniform layer. However, a manufacturing defect of this process is that while most of the resistive layer is uniform deformities crop up in the corners. Due to lack of consistency at the corners of the resistive layer an alternate means of detecting the signal of the resistive layer must be created.

In FIG. 13 a corner contact is shown which allows the contact to overcome the manufacturing deficiencies of the resistive layer. The Cathode Ray tube 1310 has a viewable area 1320 and a non-viewable area 1330. The periphery of the resistive layer 1340 is placed on the CRT 1310 and extends to all portions of viewable area 1320 and most of non-viewable area 1330 with the exception of non-coated area 1350. In this corner application the colloidal graphite in water lubricant 1360 is extended to the non-viewable areas 1330 which are covered by the resistive coating 1340. In this embodiment the spacing 1370 between the colloidal graphite in water lubricant 1360 and the viewable area 1320 is not less than 0.25 inches.

Figure 14:
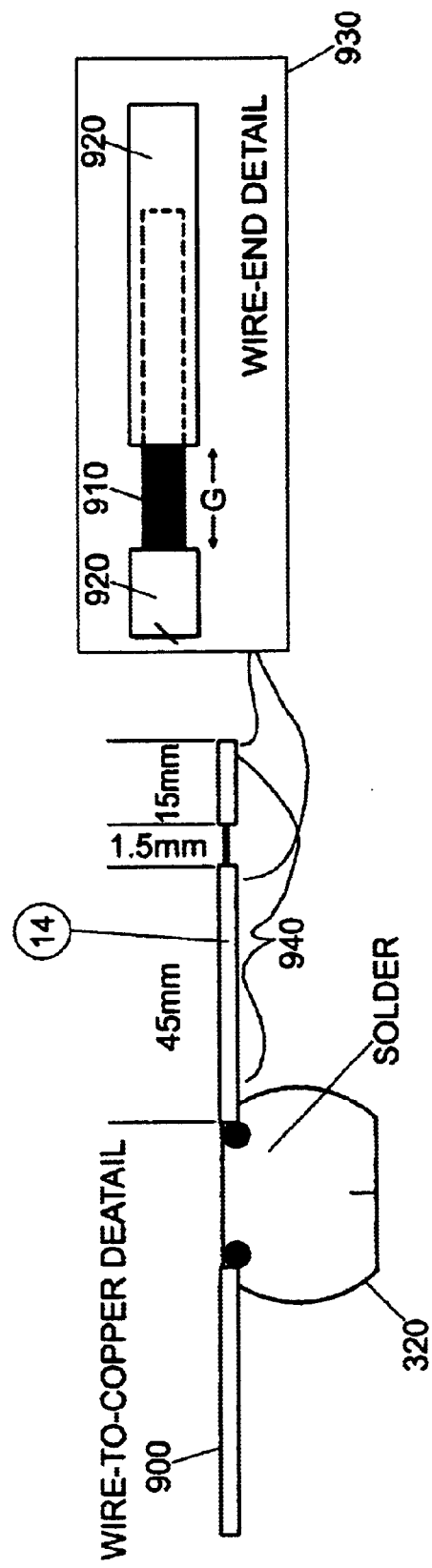

FIG. 14 is a diagram of a further embodiment especially suited for spark arrestment. As will be appreciated by those of ordinary skill in the art, the high voltages present in touch systems can present a hazard to the sensing electronics, particularly with regards to any ESD that may be generated from static discharge of users.

FIG. 14 shows a detail of an individual sensor 320 as disclosed herein. The sensor 320 may be coupled to the other sensors of an array with a conductor 900. Referring now to detail illustration 930 of FIG. 14, a detailed diagram of a spark arrestor is shown. The conductor 900 may include a center conductor 910 disposed within a layer of insulating material 920. In one disclosed embodiment, the conductor 900 may comprise an AWG 26 wire as is known in the art. In a preferred embodiment, the wire 900 may have an outer diameter of 1 mm.

To prepare the conductor as a spark arrestor 940, the insulation 920 may be scored to create a gap having a length G. The gap G may be placed electrically proximate to the ground plane of the host display. This configuration will then form a spark gap between the sensor and host display having properties determined by the insulation thickness and the gap dimensions. In a preferred embodiment, the gap is 1.5 mm in length, providing a spark gap protection of 1 kV. Other configurations may be utilized to provide protections of different ratings.

It is contemplated that the sensing system of this disclosure may be adapted to be utilized on Liquid Crystal Displays (LCD). To utilize the touch location benefits provided herein, a flat glass touch screen is provided over the soft LCD screen. The touch screen is preferably coated on both sides with the resistive coating having properties as described above. The touch screen is oriented over the LCD screen such that an inward-facing surface is adjacent to the LCD screen, and an outward-facing touch surface is provided to the user. The touch surface is preferably clear with conductive properties as disclosed herein and sufficiently hard to withstand repeated touching by a user.

To facilitate the emission of the sensor signal, a conductive material may be disposed about the perimeter of the touch screen on the inward-facing side of the touch screen and coupled to the sensor signal generation circuitry. On the outward-facing touch side of the touch screen, the sensors may be deployed as described above.

The choice of the resistivity properties of the resistive coating may depend on the method of manufacture of the flat glass panel, for example, whether the touch screen is dip- or spun-coated. In some embodiments, both sides of the flat glass panel may each have the same resistive properties.

In other embodiments, the outward-facing touch surface may have the resistive properties as described above, while the inward-facing transmissive surface (adjacent to the LCD screen) may have a lower resistivity to more evenly facilitate the sensor signal propagation.

The resistive coatings of the front and back surfaces are preferably insulated from each other along the edges to preserve the capacitive nature of the coating-glass-coating arrangement.

Since LCD systems do not provide the synch signals found in CRT displays, an alternate synchronization scheme may be provided. In one embodiment, the power line signal frequency is sensed, and the sensor signal generating circuitry is synchronized to the frequency of the power line signal. As will be appreciated, this will result in a synchronization cycle of approximately 50–60 Hz, depending on the locale, and is similar in timing to the vertical synch rate of CRT displays. Synching to the power line signal may also provide power line common-mode noise rejection benefits. Alternatively, the sensing operation may be synchronized and operated from a completely internal synchronization scheme.

As an after-market retro-fit, the entire sensing circuitry as described herein may be disposed within the power supply pack typically supplied with stand-alone LCD display or LCD-equipped laptop computers. The flat touch screen may be permanently or removably attached to the LCD display. A separate connection may be provided from the power pack to provide the sensor signal to the touch screen. As an OEM product, the sensing circuitry may be deployed within the host device or LCD display.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for sensing the location of user input comprising:
   a display unit comprising:
      a screen having a resistive coating disposed on said surface;
      pre-existing internal signal generation means for providing a pre-existing signal emanating from said screen through said resistive coating;
   microprocessor sensor signal generating means for generating a sensor signal out of phase with respect to said pre-existing internal signal, said sensor signal generating means further configured to emanate said sensor signal from said resistive coating;
   a sensor array disposed about said screen;
   sensing electronics coupled to said sensor array; and
   said sensing electronics being configured to determine the location of user input on said screen by sensing localized deviations in the amplitude of said sensor signal.

2. The apparatus of claim 1, wherein said sensing electronics are configured to sense deviations in a voltage drop across said resistive coating.

3. The apparatus of claim 2, wherein said deviations are a result of attenuation cause by a user's body capacitance.

4. The apparatus of claim 1, wherein said sensing signal is generated having an amplitude independent of the video intensity of said display unit.

5. The apparatus of claim 1, wherein said apparatus is further configured to perform a calibration routine when no user input is sensed for a predetermined period of time.

6. The apparatus of claim 1, wherein a sensing signal is generated for each of said sensors of said sensor arrays.

7. An apparatus for sensing the location of user input comprising:
   a display unit comprising:
      a screen having a resistive coating disposed on said surface;
      pre-existing internal signal generation means for providing a pre-existing signal emanating from said screen through said resistive coating;
   a sensor array disposed about said screen;
   sensing electronics coupled to said sensor array; and
   said sensing electronics being configured to determine the location of user input on said screen by sensing localized deviations in the amplitude of said pre-existing signal.

8. The apparatus of claim 7, wherein said sensing electronics are configured to sense deviations in a voltage drop across said resistive coating.

9. The apparatus of claim 8, wherein said deviations are a result of attenuation cause by a user's body capacitance.

10. An apparatus for sensing the location of user input comprising:
    a display unit comprising:
       a screen having a resistive coating disposed on said surface;
       signal generation means for providing a sensing signal emanating from said screen through said resistive coating;
    a sensor array disposed about said screen;
    sensing electronics coupled to said sensor array; and
    said sensing electronics being configured to determine the location of user input on said screen by sensing localized deviations in the amplitude of said sensing signal.

11. The apparatus of claim 7, wherein said sensing electronics are configured to sense deviations in a voltage drop across said resistive coating.

12. The apparatus of claim 8, wherein said deviations are a result of attenuation cause by a user's body capacitance.

13. The apparatus of claim 7, wherein said display unit further comprises a horizontal synch signal, and signal generation means is further configured to generate said sensing signal approximately 180° out of phase with said horizontal synch signal.

14. The apparatus of claim 13, wherein said sensing signal is generated having an amplitude independent of the video intensity of said display unit.

15. The apparatus of claim 7, wherein said apparatus is further configured to perform a calibration routine when no user input is sensed for a predetermined period of time.

* * * * *